United States Patent
Ihlenfeld

[11] 3,869,968
[45] Mar. 11, 1975

[54] COFFEE MAKER
[75] Inventor: Russell E. Ihlenfeld, Allentown, Wis.
[73] Assignee: Dart Industries, Inc., Los Angeles, Calif.
[22] Filed: Sept. 24, 1973
[21] Appl. No.: 400,197

[52] U.S. Cl.................... 99/280, 99/288, 99/294
[51] Int. Cl. .............................................. A47j 31/56
[58] Field of Search .................... 99/280, 281–282, 99/283, 285, 300, 308, 312, 315; 219/334, 442

[56] References Cited
UNITED STATES PATENTS

| | | | |
|---|---|---|---|
| 2,846,938 | 8/1958 | Brandl | 99/281 |
| 3,587,444 | 6/1971 | Godel | 99/282 |
| 3,589,271 | 6/1971 | Tarrant | 99/280 |
| 3,593,649 | 7/1971 | Novi et al. | 99/280 X |
| 3,619,561 | 11/1971 | Smit | 99/281 X |
| 3,691,933 | 9/1972 | Martin | 99/282 |
| 3,711,681 | 1/1973 | Leuschner et al. | 99/288 X |
| 3,721,176 | 3/1973 | Logan | 99/280 |

Primary Examiner—Harvey C. Hornsby
Assistant Examiner—Arthur O. Henderson
Attorney, Agent, or Firm—Kenneth J. Hovet; Leigh B. Taylor; Paul R. Wylie

[57] ABSTRACT

A coffee maker wherein a gravity fed water boiler receives water in a lower portion thereof from a water reservoir having its outlet substantially above the upper portion of said boiler; said boiler having an outlet at its upper portion for delivering hot water to a coffee brewing basket; a boiler heater in said boiler; said boiler heater disposed to create a temperature gradient between the upper and lower portions of the boiler; a thermostatic switch disposed to sense a shut-off temperature substantially below the boiling point of water; said thermostatic switch disposed at an intermediate location between the upper and lower portions of said boiler; said thermostatic switch adapted to respond to said shut-off temperature at said intermediate location and disposed to de-energize said boiler heater when flow of water from said reservoir into said heater is depleted; and a coffee pot heater having means for transferring heat to said boiler to maintain a temperature at said thermostatic switch and to thereby maintain said boiler heater de-energized during the non-brewing portion of the cycle.

8 Claims, 7 Drawing Figures

COFFEE MAKER

BACKGROUND OF THE INVENTION

Various coffee makers have utilized pressure operated switches and also check valves to control the flow of water from the reservoir through a boiler and to control the delivery of the hot water to a coffee brewing basket. Some of the prior art coffee makers have therefore used intermittent boiler feed control devices and some of them have employed thermostats exposed to the water in the boiler of such coffee makers. In many of these hot water delivery systems of coffee makers, mineral deposits have caused difficulties with the controls, pressure responsive switches, check valves, and thermostatic switches, and the respective boilers. Other difficulties have been due to the positions of check valves and thermostatic switches in communication with the water in the boiler.

In accordance with the foregoing various prior art coffee makers have employed expensive and complicated boiler control means which have required substantial maintenance due to the various aforementioned factors.

SUMMARY OF THE INVENTION

The present invention relates to a coffee maker having a water reservoir and a boiler wherein the outlet of the water reservoir is substantially above the upper portion of the boiler and wherein the water outlet of the reservoir communicates with a water inlet in the lower portion of the boiler to feed cold water to the lower portion of the boiler so that hot water may pass from the outlet of the boiler at its upper portion and wherein an electrical resistance heater is disposed in the boiler surrounded by water and adapted to create a temperature gradiant between the lower and upper portions of the boiler whereby a thermostat disposed at an intermediate location between the upper and lower portions of the boiler senses a temperature below the boiling point of water and the thermostatic switch being coupled to the heater such that it maintains the heater energized until flow of water through the heater is depleted whereupon a decrease in the overall temperature gradiant occurs and causes a shut-off temperature to occur at said intermediate location substantially below the boiling point of water whereby the heater in the boiler is de-energized in response to a depletion of water flow through the boiler.

The invention also comprises a coffee pot heater having means thermally coupled therewith for transferring heat from the coffee pot heater to the boiler of the invention to maintain a shut-off temperature of the boiler at the thermostatic switch location so as to hold the boiler heater de-energized after it has first been de-energized by a rise in temperature in the boiler due to depleted water flow therethrough.

The invention comprises a novel boiler and heater construction in which the electrical resistance heater in the boiler is provided with a pair of spaced apart generally upward and downwardly disposed portions between which flow of water from the inlet of the boiler passes upwardly to an intermediate position or location of the thermostat, relative to the lower and upper portions of the boiler, so that water passing directly from the inlet of the lower portion of the boiler is thermally caused to flow upward to said intermediate portion and to thereby maintain a temperature gradiant from the lower portion to the upper portion of the boiler and to maintain the intermediate thermostat location of the boiler at a temperature substantially below the boiling point of water while boiling water escapes from the outlet at the upper portion of the boiler.

The boiler of the coffee maker of the invention employs an electrical resistance heater internally thereof, which is completely surrounded by water and very efficient in its thermal operation in the boiler with respect to the wattage applied to the heater. Additionally, the thermostatic switch of the invention is disposed in thermally conductive relationship to the outside of the boiler housing to thereby isolate it from water internally of the boiler and to afford easy access to the thermostatic switch as well as to maintain it free of any mineral deposits which may occur as a result of water passing through the boiler. Additionally, the boiler heater of the invention is automatically de-energized by the thermostatic switch, conductively coupled to the boiler housing, with water remaining in the boiler so that the boiler does not tend to accumulate substantial mineral deposits therein.

The coffee maker of the invention employs a novel water boiler and reservoir disposed to provide for continuous flow from the reservoir to the boiler and from the boiler to a coffee brewing basket into which the boiler delivers hot water. The entire system of the invention being continuously operable without use of pressure responsive switches or check valves and the boiler system being automatically controlled by a thermostat thermally coupled to the boiler to de-energize the boiler heated when the flow of water through the system is depleted and the water level in the reservoir reaches a level below its outlet and substantially below the outlet of the boiler. Thus depletion of flow through the boiler causes a rise in temperature therein to a shut-off temperature below the boiling point of water so that the heater in the boiler is automatically shut off with water remaining in the boiler and at a temperature below the boiling point of water so that the boiler is always provided with a remaining charge of water around at least a portion of the heater following the dispensation of hot water to the coffee containing brewing basket of the coffee maker.

Accordingly, it is an object of the invention to provide a very simple, economical, and reliable coffee maker.

Another object of the invention is to provide a coffee maker which delivers water from a water reservoir through a boiler and delivers hot water to a coffee brewing basket without the use of check valves or pressure switches in the system.

Another object of the invention is to provide a very novel and simple coffee maker wherein a boiler and water flow from a reservoir to a coffee brewing basket is entirely controlled by a thermostat conductively coupled to the outside of the boiler.

Another object of the invention is to provide a novel combination of a boiler heater and a coffee pot heater wherein the boiler heater is initially shut off by response of a thermostat conductively coupled to the boiler and wherein the coffee pot heater holds coffee at a serving temperature and means thermally coupled to the coffee pot heater transfers heat to the boiler for holding it at a temperature to prevent the thermostat from re-energizing the heater therein after the heater has been de-energized in response to a depletion of flow of water therethrough.

Another object of the invention is to provide a coffee maker with a boiler wherein the heating means is internally located and completely surrounded by water.

Further objects and advantages of the invention may be apparent from the following specification, appended claims and accompanying drawings.

DESCRIPTION OF EXEMPLARY EMBODIMENTS OF THE INVENTION

Figure 1:
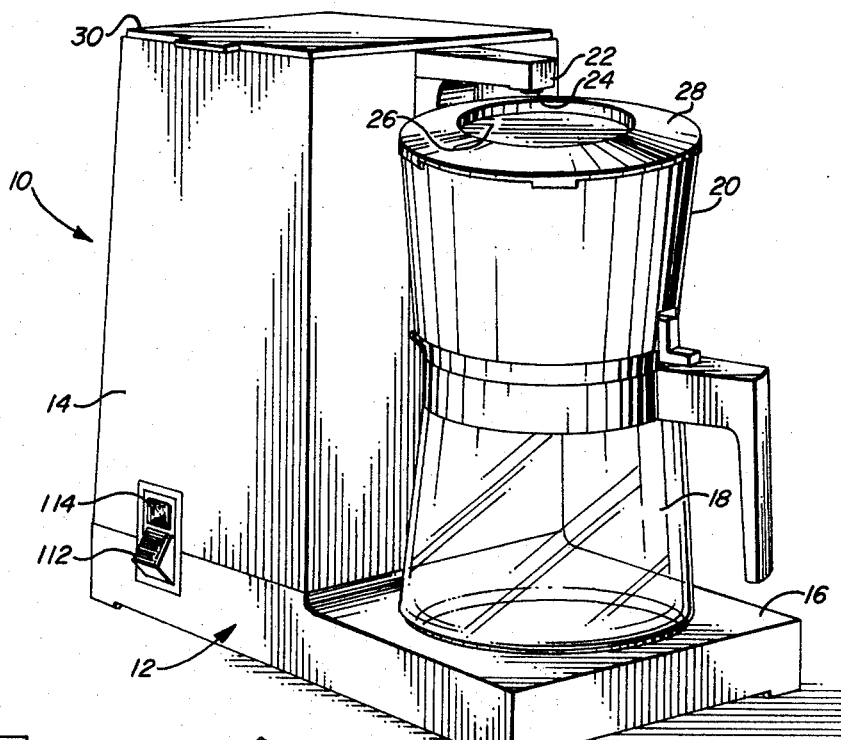
FIG. 1 is a perspective view of a coffee maker in accordance with the present invention.

As shown in FIG. 1 of the drawings, the invention comprises a coffee maker 10 having a frame 12 including a housing portion 14 which contains a water reservoir and boiler apparatus. The frame also contains a platform base portion 16 adapted to support a coffee pot 18 and a brewing basket means 20 supported thereon. The water heating apparatus is provided with a water delivery conduit 22 projecting from the housing portion 14 and this conduit is provided with a delivery opening 24 directed downward toward a recess 26 in a spreader top 28 covering the brewing basket 20 so as to disperse the water over the cross sectional area of coffee grounds therein.

Figure 2:
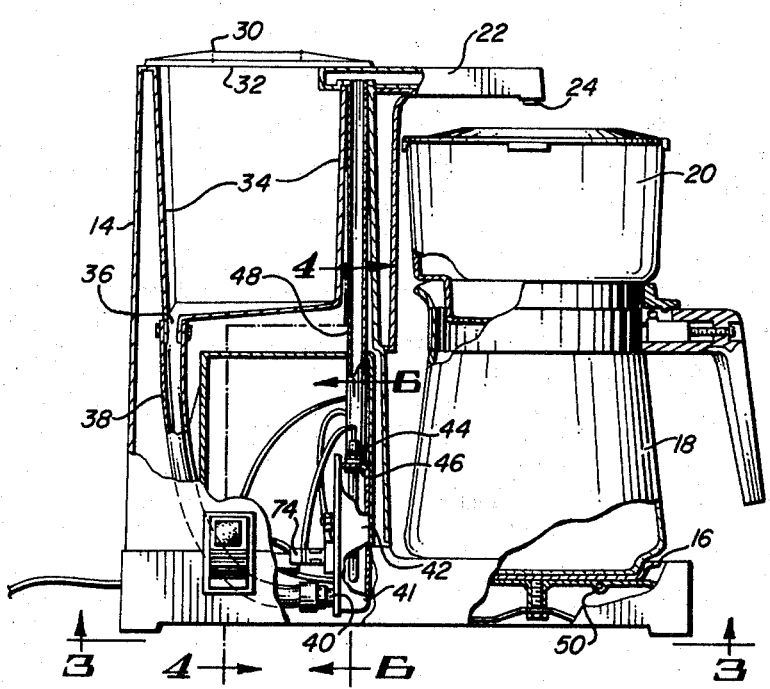
FIG. 2 is a vertical sectional view of the coffee maker shown in FIG. 1 and illustrating portions in elevation to facilitate the illustration.

Referring to FIG. 2 of the drawings, it will be seen that the housing 14 is provided with a cover 30 covering the upper open end 32 of a water reservoir 34 which is provided with an outlet 36 communicating with a conduit 38 which delivers water to a boiler inlet 40 communicating with a lower portion 41 of a hollow boiler housing 42 which is provided with an outlet 44 in its upper portion 46. The outlet 44 communicates with a hot water delivery conduit 48 which extends upward from the upper portion 46 of the boiler housing 42. This conduit 48 is coupled to the delivery spout 22 and communicates with the interior thereof so as to force water from the spout outlet portion 24 into the brewer 20 as herein before described. A coffee pot heater 50 is carried by the base portion 16 and is adapted to heat a lower portion of the coffee pot 18 for maintaining coffee therein at a serving temperature.

As shown in FIG. 2 it will be seen that the outlet 36 of the reservoir 34 is considerably above the upper portion 46 of the boiler 42 and considerably above the outlet 44 of the boiler 42 which communicates with the hot water delivery tube 48.

Figure 5:
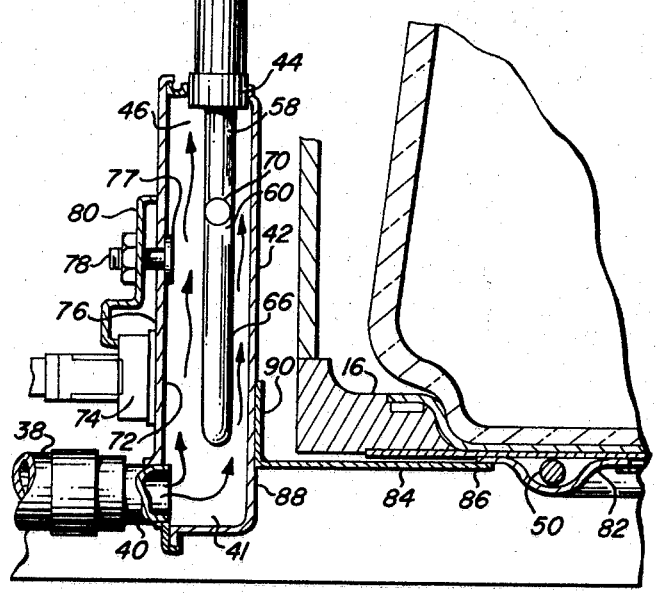
FIG. 5 is an enlarged fragmentary sectional view of the boiler and coffee pot heater of the invention taken from the line 5—5 of FIG. 4.
Figure 6:
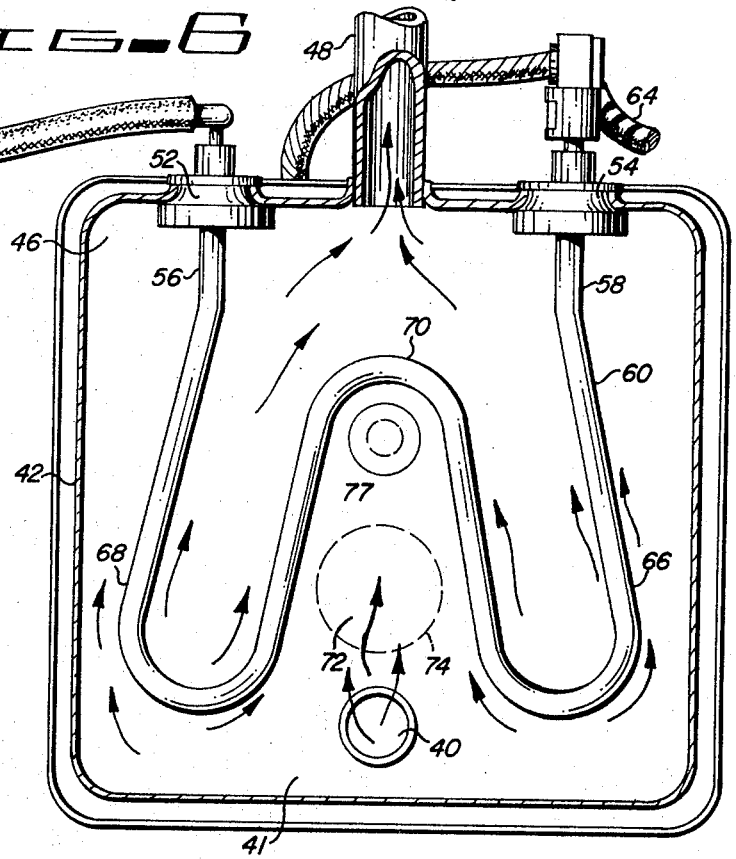
FIG. 6 is an enlarged fragmentary sectional view of the boiler of the invention taken from the line 6—6 of FIG. 2.

With reference to FIGS. 5 and 6 of the drawings, it will be seen that the boiler housing 42 at its upper portion 46 is provided with a pair of hermetically sealed heater resistance element mounts 42 and 54 which mount opposite ends 56 and 58 of an electrical resistance heater 60. Coupled to the end 56 of the electrical resistance element 60 outside the boiler housing 42 above the upper portion thereof is a conductor 62 and coupled to the end 58 of the element 60 outside the housing is a conductor 64, and these conductors will be hereinafter described in relation to the diagramatic view FIG. 7.

The heating element 60, shown in FIG. 6 of the drawings, is provided with a pair of generally upwardly and downwardly extending portions, each portion comprising a generally upright U-shaped portion. The upright U-shaped portion 66 has one end coupled to the end portion 58 and the other upright U-shaped portion of the pair is designated 68 and it is coupled to the end 56 of the heating element 60.

An inverted U-shaped portion 70 of the heating element is integral with the U-shaped portions 66 and 68 and it is disposed substantially above an intermediate location 72 which is directly above the water inlet 40 of the boiler housing 42.

At the intermediate location 72 a thermostatic switch 74 is coupled in thermally conductive relationship to a sidewall 76 of the boiler housing. The thermostatic switch 74 is of conventional snap action construction subject to the usual temperature differential between its closing and opening responses. It will be seen that the position of the switch 74, at the intermediate location 72, is in proximity to the water inlet 40 and below the inverted U-shaped portion 70 of the electrical resistance heater. The upwardly and downwardly extending U-shaped portions 66 and 68 straddle the area of the intermediate location 72 as well as the area above the water inlet 40.

A bolt 78 is secured to the wall 76 and engages a clamping bracket 80 which clamps the body of the thermostatic switch 74 securely against the sidewall 76 of the boiler housing 42 at said intermediate location 72.

The illustrated and described boiler assembly is the preferred embodiment. The heating element could be of an alternate shape, for example without the inverted U-shaped portion 70 or inverted so the ends 56 and 58 extend downward instead of upward. Also, the location of the thermostatic switch can be shifted, for example to the center of the U-shaped portion 66 or 68.

The disposition of the electrical resistance heater 60 in the boiler housing 42 is such that it causes heating of water in the boiler housing and creates a temperature gradiant ranging from cold water at the boiler inlet 40 to boiling water at the boiler outlet 44, and this gradiant, for example, is such that water at the inlet 40 may be 60° Fahrenheit while the water temperature at the intermediate location 72 adjacent to thermostatic switch 74 may be 100° F. while water in the upper end or upper portion 46 of the boiler housing at the outlet 44 may be boiling water. This is the temperature gradiant that exists when water is flowing from the reservoir 34 through the boiler housing 42 as will be hereinafter described. The thermostatic switch 74 is a normally closed switch calibrated to open at 180° Fahrenheit, for example, when water flow from the reservoir 34 is depleted and such flow through the boiler housing 42 reaches a predetermined minimum. The thermostatic switch 74 is electrically coupled to energize and de-energize the electrical resistance heater 60 and this thermostatic switch 74 is adapted therefore to de-energize the electrical resistance heater 66 when temperature at said intermediate location reaches 185°, for example. It will be understood that the flow of water from the reservoir 34 may be continuous through the boiler housing 42 and upwardly through the conduit 48 and into the coffee basket 20 as herein before described. When the water level from the reservoir 34 passes to a level below the outlet 44 of the boiler housing 42, flow through the housing is depleted and the temperature gradient decreases such that the temperature at the intermediate location 72 rises from 100° to 185° which is a shut-off temperature of the thermostatic switch 74, which at that shut-off temperature, de-energizes the electrical resistance heater 66.

As shown in FIG. 5 of the coffee pot heater 50 is an electrical resistance heater supported in conductive plate means 82 on the frame base portion 16 as herein before described.

Conductively coupled by means of rivets, welding or otherwise, is a heat conductor 84 which is secured to the plate means 82 at 86 so as to transfer heat from the coffee pot heater 50 to one side 88 of the boiler housing 42. The heat conductor 84 being provided with a portion 90 conductively coupled to the side 88 of the boiler housing 42 by a suitable conductive coupling arrangement so that heat is transferred from the coffee pot heater 50 to the boiler housing 42. The heat transfer from the coffee pot heater 50 to the boiler housing 42 is sufficient to maintain said intermediate location 72 and the thermostatic switch 74 at a temperature above the turn-on temperature of 130° Fahrenheit which is the temperature at which the thermostatic switch 74 will close and re-energize the electrical resistance heater 66.

Figure 7:
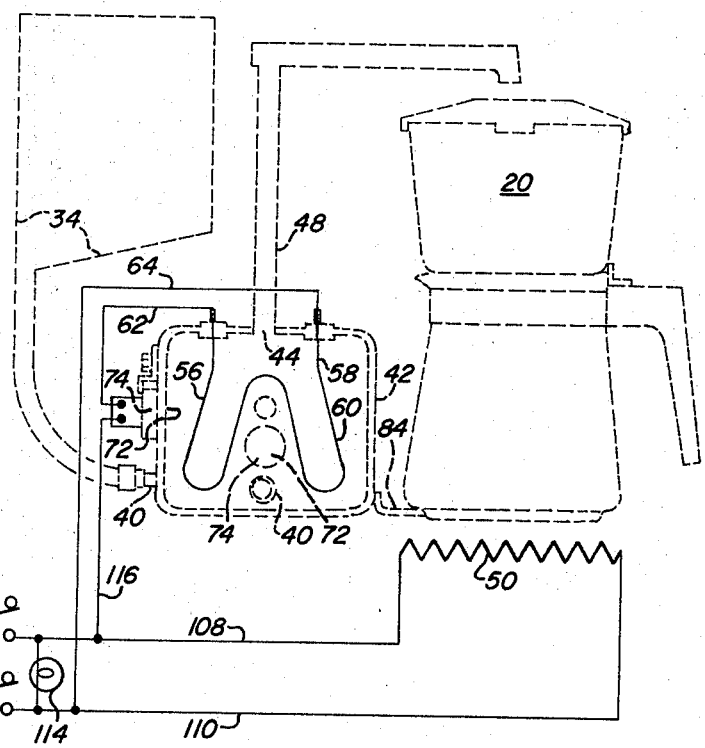
FIG. 7 is a diagramatic view of the functional apparatus of the coffee maker of the invention including principal mechanical and electrical components thereof.

Referring to the diagramatic view FIG. 7, it will be seen that the disclosure of the thermostatic switch 74 is displaced for convenience of illustration; however, its actual location is indicated by broken lines in correspondence with that location shown in FIG. 6 of the drawings. Likewise, the water inlet location 40 is also shown by broken lines due to the fact that the inlet 40 is actually displaced for convenience of illustration. Accordingly, the diagramatic view does not conform to the actual physical features of the invention shown in FIGS. 5 and 6 simply due to the necessity for clarity in the disclosure in the diagramatic arrangement of the invention.

The invention is provided with an electrical male plug 92 having a pair of prongs 94 and 96 adapted to be electrically coupled to a conventional 120 volt outlet. Coupled to the prong 94 is a conductor 98 and coupled to the prong 96 is a conductor 100. The invention is provided with a double pole on-off switch 102 having switch elements 104 and 106 adapted to engage and disengage with circuit conductors 108 and 110 respectively.

Figure 3:
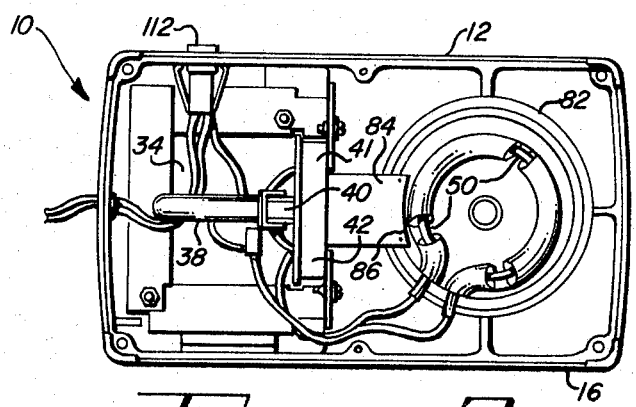
FIG. 3 is a bottom plan view of the coffee maker of the invention taken from the line 3—3 of FIG. 2.
Figure 4:
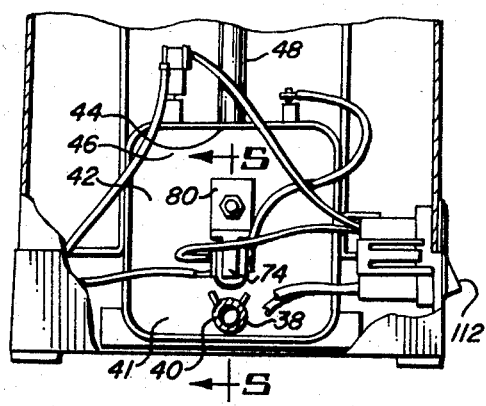
FIG. 4 is a fragmentary sectional view taken from the line 4—4 of FIG. 2.

With reference to the mechanical disclosure in the drawings, the on-off switch control is designated 112 and is shown in FIGS. 1, 3, and 4 of the drawings. This is a simple, manually operable switch control having a light 114 adjacent thereto, indicating energization of the conductors 108 and 110 shown in FIG. 7 of the drawings.

Coupled to the conductor 108 is a conductor 116 which is coupled to the thermostatic switch 74 which is an on-off switch, and coupled to this thermostatic switch 74 is the conductor 62 which is coupled to the end 56 of the electrical resistance heater 60 hereinbefore described. Coupled to the opposite end 58 of this resistance heater is the conductor 64 which is coupled to the conductor 110 hereinbefore described.

The conductors 108 and 110 are coupled to opposite ends of the coffee pot heater 50 which is an electrical resistance heater all as shown best in FIG. 7 of the drawings.

When the double pole switch 102 is closed and the conductors 108 and 110 are energized, the thermostatic switch 74, being normally closed, energizes the electrical resistance heater 60, and it begins to heat water in the boiler 42. The water is thus heated such that its relative density is reduced, thus head pressure is reduced and coupled with bubbles passing upwardly through the water and in the tube 48 causes hot water to be delivered to the upper portion of the brewer basket 20. This process normally causes the foregoing temperature gradient to exist in the water, namely an example being a 60° water temperature at the boiler inlet 40, with a boiling water temperature existing at the outlet 44 and the gradient from the inlet 40 to the outlet 44 being such that temperature at the intermediate location 72 affords the thermostatic switch 74 a 100° temperature which does not cause it to actuate to an open position.

When the water has been exhausted from the reservoir 34 and is depleted such that its level is down to a position below the outlet 44 of the boiler housing 42, flow through the boiler housing is depleted and the temperature gradient changes such that the intermediate location 72 is subjected to a temperature rising to 185° which is a shut-off temperature for the thermostatic switch 74 which causes it to open and shut off the energy to the resistance heating element 60 which is thereby de-energized. The water remaining in the boiler housing 42 is held above the 130° turn-on temperature by heat transferred through the heat conductor 84 from the coffee pot heater 50. Thus, once the electrical resistance heater 60 in the boiler has been de-energized by opening of the thermostatic switch 74, this switch is held open by the maintenance of a temperature, within the differential of the thermostatic switch due to heat being transferred from the coffee pot heater 50 to the boiler housing 42. Thus, the water remaining in the boiler housing 42 is not evaporated and the boiler heater 60 is maintained in a de-energized condition until the water reservoir 34 is again refilled and the switch 102 is again closed.

Inasmuch as the thermostatic switch 74 is outside the boiler housing 42, it is not subjected to mineral deposits of water passing through the boiler 42 and inasmuch as a continuous flow, during water heating, exists between the reservoir 34 and the hot water delivery tube 48, the need for a check valve or pressure switch in the system is obviated. The simple thermostatic switch 74 at the intermediate location controls the operation of the boiler heater 60 in reference to water flow through the boiler and the heat conductor 84 transfers heat from the coffee pot heater 50 to hold the switch 74 open to maintain a remaining amount of water in the boiler housing 42 as hereinbefore descirbed.

It will be apparent to those skilled in the art that various modifications may be resorted to without departing from the spirit of the invention.

I claim:

1. In a coffee maker: a frame; a water reservoir supported on said frame; said water reservoir having a water outlet; a water boiler supported on said frame; said water boiler having upper and lower portions; said boiler having a cold water inlet in its lower portion; a first conduit means disposed to conduct water from said outlet of said reservoir into said inlet of said boiler at said lower portion thereof; an electric resistance heater in said boiler; said boiler having a hot water outlet at said upper portion thereof; a second conduit means communicating with said outlet of said boiler; said second conduit means extending upwardly above said boiler and having a hot water delivery portion adapted and disposed to deliver hot water to an upper portion of a coffee brewer, said resistance heater disposed in said boiler so as to be surrounded by water therein and to cause a temperature gradiant in said water ranging between the cold water temperature in said lower portion of said boiler to a water boiling temperature near said upper portion of said boiler; a normally closed thermostatic switch electrically coupled with said resistance heater and disposed to sense the temperature of said boiler at an intermediate location between said upper and lower portions thereof; said normally closed thermostatic switch adapted to open and de-energize said resistance heater in response to a shut-off temperature substantially below that of boiling water at said intermediate location between upper and lower portions of said heater, whereby said heater thermally dispenses hot water upwardly through said second conduit until water has gravitated from said reservoir to a level below said outlet in said upper portion of said boiler at which time hot water ceases to rise in said second conduit and said resistance heater continues to heat the remaining water in said boiler, whereupon the temperature gradiant changes until the temperature at said intermediate location of said boiler has been elevated to said shut-off temperature whereupon said thermostatic switch responds to said shut-off temperature and de-energizes said resistance heater; said frame further supporting a coffee pot heater; said coffee pot heater adapted to maintain a pot of coffee at a desired serving temperature; and means thermally coupled with said boiler and disposed and adapted to transfer heat from said coffee pot heater to said boiler for holding the temperature thereof such that a temperature is maintained at said intermediate location of said boiler to maintain said thermostatic switch in open position and thereby maintaining said electrical resistance heater de-energized to prevent boiling of said remaining water in said boiler.

2. The invention as defined in claim 1 wherein: means is provided for electrically energizing said resistance element of said coffee pot heater independently of said thermostatic switch.

3. The invention as defined in claim 1, wherein: said thermostatic switch is thermally conductively coupled to an outer side of said boiler housing at said intermediate location and thereby remote from direct contact of liquid in said boiler housing.

4. In a coffee maker; a water boiler housing having an electrical boiler heater; a thermostatic switch coupled to said boiler heater for electrically energizing and de-energizing it; said thermostatic switch disposed to sense the temperature of said boiler for controlling said heater; a coffee pot heater; and thermally conductive means disposed and adapted to transfer heat from said coffee pot heater to said boiler to thereby hold said thermostatic switch at a temperature to maintain said boiler heater de-energized after water flow through said boiler has been reduced and depleted and after said thermostatic switch has initially responded to an increase in boiler temperature which has thereby de-energized said boiler heater.

5. The invention as defined in claim 4 wherein said water boiler housing includes upper and lower portions and said thermostatic switch is disposed to sense temperature at an intermediate location between said upper and lower portions of said boiler housing; said thermostatic switch adapted to respond to an elevated temperature below the boiling point of said liquid to thereby de-energize said heater; said intermediate location being above said inlet; said electrical boiler heater having a pair of portions extending generally in upward and downward directions; said pair of heater portions straddling said intermediate location above said inlet to provide for upward thermal flow of unheated liquid from said inlet to said intermediate location to prevent the occurrence of said elevated temperature at said intermediate location until flow of unheated liquid into said inlet reaches a predetermined minimum.

6. The invention as defined in claim 5, wherein: said pair of heater portions being upright U-shaped portions; and an inverted U-shaped heater portion integral with said pair of upright U-shaped heater portions; said inverted U-shaped heater portion being generally above said intermediate location; said boiler heater having opposite end portions integral with said upright U-shaped portions; said opposite end portions of said boiler heater extending outward through said upper portion of said boiler housing.

7. The invention as defined in claim 6, wherein: said liquid outlet is disposed between said opposite end portions of said boiler heater.

8. The invention as defined in claim 4, wherein: said thermostatic switch is thermally conductively coupled to an outer side of said boiler housing at said intermediate location and thereby remote from direct contact with liquid in said boiler housing.

* * * * *